United States Patent [19]

Kawasumi et al.

[11] Patent Number: 4,856,412

[45] Date of Patent: Aug. 15, 1989

[54] VACUUM OPERATED BOOSTER

[75] Inventors: Satoshi Kawasumi, Takahama; Yuzuru Sugiura; Hiroyuki Kondo, both of Anjo; Akihiko Miwa, Toyota; Kazuhiko Suzuki, Kariya, all of Japan

[73] Assignee: Aisin Seiki Kabushiki Kaisha, Kariya, Japan

[21] Appl. No.: 89,835

[22] Filed: Aug. 27, 1987

[30] Foreign Application Priority Data

Aug. 29, 1986 [JP] Japan .................... 61-131115[U]

[51] Int. Cl.$^4$ .................................................. F15B 9/10
[52] U.S. Cl. .................................... 91/369.2; 91/376 R
[58] Field of Search .............. 91/369 A, 369.1, 369.2, 91/369.3, 369.4, 376 R

[56] References Cited

U.S. PATENT DOCUMENTS

| | | | |
|---|---|---|---|
| 4,257,312 | 3/1981 | Ohmi et al. | 91/369.3 |
| 4,472,997 | 9/1984 | Ohmi . | |
| 4,491,056 | 1/1985 | Tsubouchi | 91/369 A |
| 4,499,812 | 2/1985 | Pressaco et al. | 91/369.3 X |
| 4,535,680 | 8/1985 | Takayama et al. | 91/369 A X |
| 4,587,885 | 5/1986 | Boehm et al. . | |
| 4,590,845 | 5/1986 | Tateoka et al. . | |
| 4,594,937 | 6/1986 | Meynier et al. . | |
| 4,598,625 | 7/1986 | Belart . | |
| 4,619,185 | 10/1986 | Mori et al. . | |
| 4,729,288 | 3/1988 | Thioux | 91/369.2 X |

FOREIGN PATENT DOCUMENTS

| | | | |
|---|---|---|---|
| 202968 | 11/1984 | Japan | 91/369 A |
| 157951 | 8/1985 | Japan | 91/369 A |

Primary Examiner—Robert E. Garrett
Assistant Examiner—Mark A. Williamson
Attorney, Agent, or Firm—Burns, Doane, Swecker & Mathis

[57] ABSTRACT

A booster, for use as an automotive brake booster is disclosed which works quickly at the beginning of an operation sequence. The booster has a housing with a piston capable of sliding in the opening of the housing and acting on a diaphragm dividing the inside of the housing into a constant pressure chamber and a variable pressure chamber. An output rod is provided having a rear end portion inserted in the power piston. A reaction disk is mounted between the output rod and the power piston with a retainer mounted on the power piston on the side of the constant pressure chamber. The retainer prevents the output rod from coming off and also causes the output rod to push the reaction plate toward the piston.

3 Claims, 1 Drawing Sheet

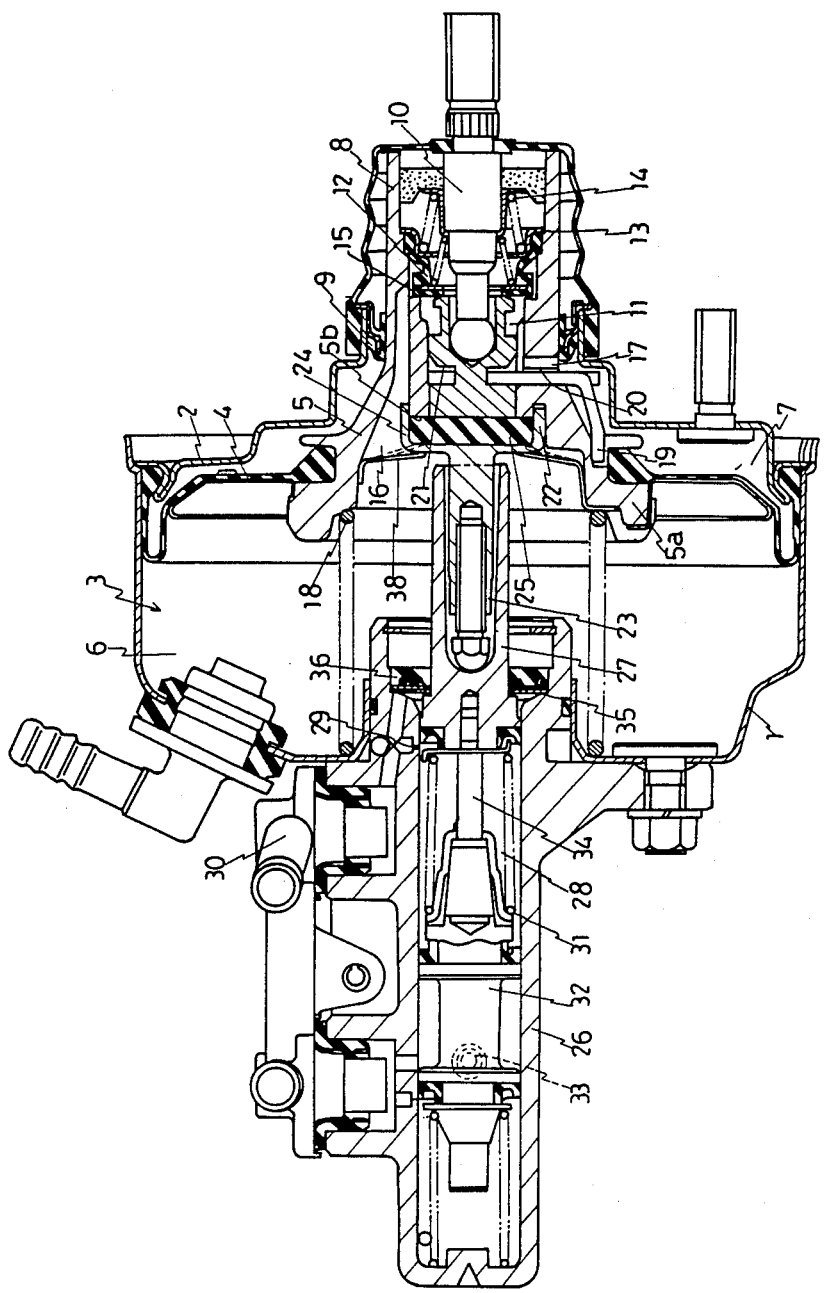

VACUUM OPERATED BOOSTER

FIELD OF THE INVENTION

The present invention relates to an automotive brake booster, i.e., a vacuum operated booster

BACKGROUND OF THE INVENTION

A conventional vacuum operated booster is disclosed in U.S. Pat. No. 4,587,885. This booster comprises a housing having an opening at one end, a power piston extending through the opening, a diaphragm that divides the inside of the housing into a constant pressure chamber and a variable pressure chamber. A valve plunger is fitted in a small hole or opening formed in the power piston so as to be slidable, and a control valve is disposed in the power piston which can hermetically slide in the opening. The outer fringe or edge of the diaphragm is hermetically held to the housing, while the inner fringe or edge hermetically fits over the outer periphery of the power piston. The valve plunger is connected to a pushrod which interlocks with the brake pedal of an automobile. When the booster is not in operation, the control valve bears against the rear end of the valve plunger. The booster further includes a control valve mechanism, an output rod having a rear end portion, and a reaction disk that is mounted between the rear end portion of the output rod and the power piston in a large hole or opening formed in the power piston, the large hole being in communication with the small hole or opening. The rear end portion of the output rod is fitted in the large hole or opening so as to be slidable therein. The control valve mechanism connects the variable pressure chamber either with the constant pressure chamber or with the atmosphere, depending on whether or not the brake pedal is depressed. To limit axial movement of the output rod within the large hole or opening in the power piston, a retainer is disposed in the constant pressure chamber. One end of the retainer is anchored to a sleeve that is fixed to the power piston, while the other end can come into contact with the end surface of the output rod which is on the side of the constant pressure chamber.

When the conventional vacuum booster constructed as described above is not in operation, a given or predetermined space is formed between a master cylinder piston and the front end of the output rod to prevent the brakes from dragging. The retainer simply acts to prevent the output rod from coming off and does not press the output rod against the piston. Therefore, when the booster is not in operation, the output rod tilts and causes a gap to open between the reaction disk and the end surface of the power piston. At the beginning of the operation, the gap between the control valve and the seat portion of the power piston is closed causing air to flow into the variable pressure chamber. At this time, the pressure inside the variable pressure chamber must be different from the pressure inside the constant pressure chamber. However, air flows from the variable pressure chamber into the constant pressure chamber through the aforementioned gap between the reaction plate and the end surface of the piston. As a result of the air flow, the booster does not work quickly at the beginning of the booster operation sequence.

SUMMARY OF THE INVENTION

It is an object of the present invention to provide a vacuum operated booster which overcomes the foregoing problem.

The above object is achieved by a vacuum operated booster which includes a housing having an opening at one end; a power piston extending through the opening so as to be hermetically slidable therein; a diaphragm which divides the inside of the housing into a constant pressure chamber and a variable pressure chamber with an outer fringe or edge of the diaphragm being hermetically held by the housing and the inner fringe of the diaphragm hermetically fitting over the outer periphery of the power piston.

A small hole or opening is formed in the power piston and a valve plunger which is connected to a pushrod interlocked with the brake pedal of an automobile is fitted in the small hole so as to be slidable therein. A control valve is provided which is mounted in the power piston and which, when the booster is not in operation, engages with the rear end of the plunger. A control valve mechanism places the variable pressure chamber into communication either with the constant pressure chamber or with the atmosphere, depending on whether or not the brake pedal is depressed. A large hole or opening is provided in the power piston and communicates with the small hole or opening and an output rod having a rear end portion is fitted in the large hole or opening so as to be slidable therein. A reaction disk is mounted between the rear end portion of the output rod and the power piston within the large hole. The booster also includes a retainer positioned on the power piston on the side of the constant pressure chamber. One end of the retainer is anchored to the power piston, while the other end is pressed against the rear end portion of the output rod so that the output rod pushes the reaction disk toward the power piston.

The retainer for limiting axial movement of the output rod is biased so that it pushes the output rod toward the piston when the booster is not in operation. Accordingly, the reaction plate is pressed against the end surface of the piston by the output rod to maintain an airtight seal Therefore, air will not leak into the negative pressure chamber when air flows into the variable pressure chamber at the beginning of the operation. Hence, the booster works quickly at the beginning of the booster operation sequence.

BRIEF DESCRIPTION OF THE DRAWING

The FIGURE is a side elevation in cross section of a vacuum operated brake booster according to the invention.

DETAILED DESCRIPTION OF A PREFERRED EMBODIMENT

The FIGURE shows a vacuum operated booster embodying the invention. The booster has a left housing 1 and a right housing 2 which cooperate to form a chamber 3. A diaphragm 4 having an outer fringe or edge is sandwiched between the housings 1 and 2 and is mounted in the chamber 3. A resinous power piston 5 has an enlarged end portion 5a over which the inner fringe or edge of the diaphragm 4 is hermetically fitted or engaged. The inside of the chamber 3 is divided into a constant pressure chamber 6 and a variable pressure chamber 7 by the diaphragm 4 and the piston 5.

The piston 5 has a cylindrical portion 8. This cylindrical portion 8 extends through a hole or opening formed in the center of the housing 2 so as to be slidable therein. A seal 9 maintains this opening in an airtight manner. An end of a pushrod 10 extending outside the booster is connected to the brake pedal (not shown) of an automobile, while the other end is in the form of a ball element and is connected to a valve plunger 11. The power piston 5 has a small hole o opening and the plunger 11 is guided in this hole so as to be slidable therein. A control valve 12 cooperates with the valve plunger 11 to control communication of the variable pressure chamber 7 with the atmosphere. One end of the valve 12 is fixedly connected to the cylindrical portion 8 via a retainer 13 so as to be sealable. A spring 14 is mounted between the retainer 13 and the recessed portion of the pushrod 10 to urge the pushrod 10 to the right, as shown in the drawing.

The left end of the outer periphery of the control valve 12 is in contact with the valve plunger 11. The piston 5 is provided with a seat portion 15 which surrounds the left end portion. The seat portion 15 is seated on or disengaged from a control valve 12 dependent upon whether the brake pedal (not shown) is depressed or released The chambers 6 and 7 are in communication with each other via passages 16 and 17 A restoring spring 18 pushes or biases the power piston 5 to the right, as shown in the drawing, when the booster is not in operation. The piston 5 is provided with a hole or opening 20 in which a key element 19 is received. The outer periphery of the valve plunger 11 is provided with a groove 21 in which the key 19 is received with the upper end of the key 19 being disengaged therefrom.

When the booster is not in operation, the key 19 is in contact with the surface of the wall of the hole or opening 20 in the piston 5 which faces away from the housing 2. The piston 5 further includes a large hole or opening communicating with the small hole or opening. A substantially annular groove 22 is provided in a portion of the large hole or opening on the side of the constant pressure chamber 6. An output rod 23 has a cylindrical portion 24 which is received in the groove 22. A reaction plate 25, made of a rubber type material is interposed between the cylindrical portion 24 and the valve plunger 11.

When the brake booster is not in operation, a base portion of the key 19 is in contact with the housing 2 and prevents the power piston 5 from moving rearward. When the booster is in operation, the output rod 23 is moved. This movement is transmitted to a first piston 27 of a master cylinder 26. The first piston 27 is then advanced or moved to increase the pressure inside the pressure chamber 28 of the master cylinder 26. When the booster is not in operation, the pressure chamber 28 is in communication with a reservoir 30 through a small hole or opening 29 and, therefore, no pressure exists in the chamber 28.

When the first piston 27 is advanced or moved to the left as shown in the drawing to disconnect the pressure chamber 28 from the small hole 29, the pressure inside the chamber 28 is increased. A spring 31 is mounted or positioned between the first piston 27 and a second piston 32 so as to bias the first piston 27 to the right as shown in the drawing. Movement of the second piston 32 is limited by a stopper element 33. The first piston 27 is connected to the second piston 32 via a rod 34. In the illustrated condition, the first piston 27 is unable to move to the right but is free to move to the left as the rod 34 can move to the left independent of the second piston 32.

A seal cup 36 is hermetically inserted into an opening portion of the master cylinder 26. The first piston 27 hermetically slides along a circumferentially inner surface of the seal cup 36 so as to maintain the constant pressure chamber 6 airtight. A retainer ring 35 is positioned between the seal cup 36 and a bottom section 37 of the opening portion of the master cylinder 26 and the seal cup 36. The retainer ring 35 controls proper positioning of the seal cup 36 and maintains positioning of the first piston 27 within a predetermined limit. A retainer 38 has one end engaged with the power piston 5 under the influence of the restoring spring 18. The other end of the retainer 38 bears against the end surface of the output rod 23 and is on the side of the constant pressure chamber to limit axial movement of the rod 23 in one direction. The FIGURE depicts the preferred embodiment of the retainer 38 as being spaced from the power piston at positions other than where the retainer is attached to the piston rod. The retainer 38 acts to push the output rod 23 toward the piston 5. Under the free condition, the retainer 38 assumes a form as indicated by the broken line. After the booster has been assembled, the retainer 38 takes a form as indicated by the solidline such that the intermediate (central) portion and the other end of the retainer 38 extend from the power piston 5 radially inwardly and axially towards the reaction disk (plate) 25. In this state, the end of the retainer 38 extends toward the output rod at an angle so that a central portion of the retainer 38 is biased to the left, as shown in the drawing, and bears against the side surface of the cylindrical portion 24 of the output rod 23 and thus pushes against the rod 23.

The booster constructed as described thus far operates in the manner described below. In the illustrated condition, the booster is not in operation. When the brake pedal is depressed downwardly to push the pushrod 10 to the left, the control valve 12 is moved together with the valve plunger 11 by the action of the spring 14 until it comes into contact with the seat portion 15. The plunger 11 is then disengaged from the control valve 12 to permit air to flow into the variable pressure chamber 7 through the passage 17. Therefore, the pressure inside the chamber 7 becomes different from the pressure inside the constant pressure chamber 6. This differential pressure pushes the piston 5 to the left and causes the reaction plate 25 to advance the output rod 23. The rod 23 then pushes the first piston 27 of the master cylinder 26 to the left, as shown in the drawing, to thereby increase the pressure inside the pressure chamber 28.

As described in detail thus far, the retainer 38 for preventing the output rod 23 from coming off pushes the output rod toward the piston, the output rod engaging with the side surface of a cylindrical portion of the retainer. Therefore, the seal between the reaction plate and the front end of the power piston is assured even if the booster is not in operation. Consequently, air flow from the variable pressure chamber into the negative pressure chamber at the beginning of the operation of the booster is prevented. Thus, a booster is provided which functions rapidly and which is provided in an assembly which permits any air trapped between the cylindrical portion 24 of the output rod 23 and the reaction plate 25 to be properly discharged during the manufacture of the booster.

The principles, preferred embodiments and modes of operation of the present invention have been described in the foregoing application The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A vacuum operated booster comprising:
   a housing defining an interior and having an opening at one end;
   a power piston extending through the opening and hermetically slidable therein;
   a diagram dividing the interior of the housing into a constant pressure chamber and a variable pressure chamber, an outer edge of the diaphragm being hermetically connected to the housing, an inner edge of the diaphragm hermetically fitting over an outer peripheral portion of the power piston;
   a first opening provided in the power piston;
   a valve plunger connected to a pushrod interlocking with a brake pedal of an automobile and received in the opening so as to be slidable therein;
   a control valve mounted in the power piston and which, when the booster is not in operation, engages with a rear end portion of the plunger;
   a control valve mechanism placing the variable pressure chamber into communication with one of the content pressure chamber and the atmosphere dependent on depression of the brake pedal of the automobile;
   an opening relatively larger than said first opening provided in the power piston and communicating with the first opening;
   an output rod having a rear end portion received in the relatively larger opening so as to be slidable therein;
   a reaction disk mounted between the rear end portion of the output rod and the power piston within the relatively larger opening; and a retainer having one end connected to the power piston, an opposite end pressed against the rear end portion of the output rod so that the output rod pushes the reaction disk toward the power piston to provide a spring force acting against the output rod even when the booster is in an unactuated state, and an intermediate portion extending from said one end to said opposite end, the retainer being positioned on the power piston on the constant pressure chamber side, said intermediate portion and said opposite end of the retainer being spaced from said power piston and said opposite end of the retainer extending toward and pressing against the rear end portion of the output rod at an angle, said one end of the retainer being anchored to the power piston by a spring which is mounted in the constant pressure chamber, said spring biasing the power piston toward the variable pressure chamber, whereby at least a portion of said retainer is biased.

2. A vacuum operated booster as set forth in claim 1, wherein the rear end portion of the output rod has a cylindrical portion received in an annular groove provided in the outer edge of a bottom portion of the relatively larger opening formed in the power piston, the reaction disk being received in the cylindrical portion.

3. A vacuum operated booster as set forth in claim 1, wherein said intermediate portion and said opposite end of the retainer extend from the power piston radially inwardly and axially towards the reaction disk.

* * * * *